United States Patent [19]
Harrison

[11] 4,067,074
[45] Jan. 10, 1978

[54] WATER SAVER FLUSH VALVE MECHANISM

[76] Inventor: Stanley Harrison, 1629 S. 16th St., Philadelphia, Pa. 19145

[21] Appl. No.: 696,520

[22] Filed: June 16, 1976

[51] Int. Cl.² .............................................. E03D 1/14
[52] U.S. Cl. ...................................................... 4/324
[58] Field of Search ................... 4/34, 1, 37, 56, 57 P, 4/57 R, 67 R, 67 A; 251/285

[56] References Cited

U.S. PATENT DOCUMENTS

| | | | |
|---|---|---|---|
| 1,288,691 | 12/1918 | Schafer | 251/285 |
| 1,963,211 | 6/1934 | Patterson | 4/67 R |
| 2,615,174 | 10/1952 | Barling | 4/67 A |
| 2,802,218 | 8/1957 | Wanger | 4/67 R X |
| 2,803,833 | 8/1957 | Charest | 4/67 R X |
| 3,775,778 | 12/1973 | Lee | 4/67 A |

Primary Examiner—Richard E. Aegerter
Assistant Examiner—Stuart S. Levy
Attorney, Agent, or Firm—Weiser, Stapler & Spivak

[57] ABSTRACT

A water saver flush mechanism which functions through the handle of a toilet water storage tank to move the mechanism from a first mode of operation wherein only a portion of the water within the tank is flushed to a second mode of operation wherein the entire contents of the tank are flushed. The handle moves a support rod and operating finger which are positioned normally to limit the opening of the tank flush valve to a position to permit full opening of the flush valve, thereby permitting full flushing of the tank contents.

10 Claims, 5 Drawing Figures

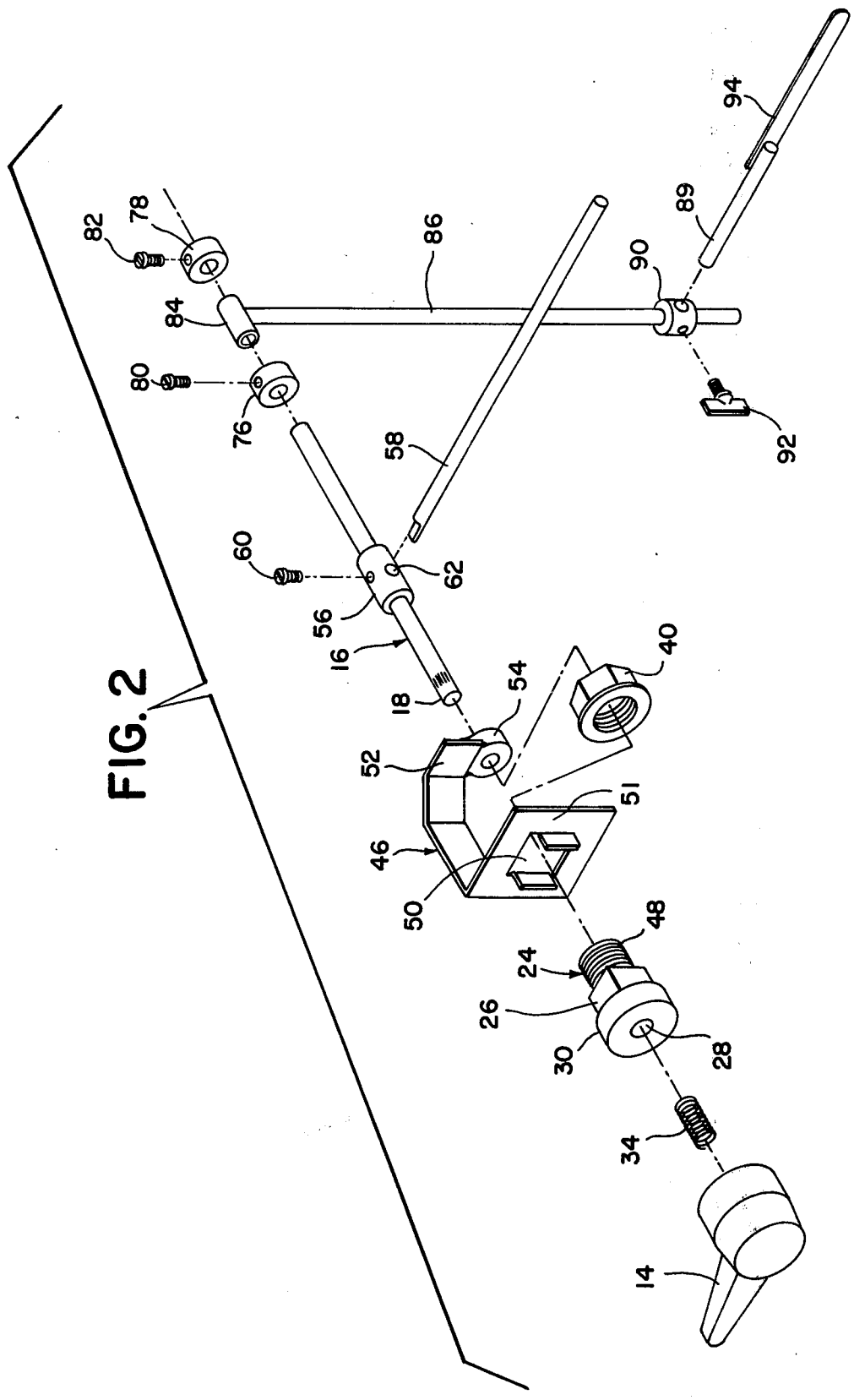

WATER SAVER FLUSH VALVE MECHANISM

BACKGROUND OF THE INVENTION

The invention relates generally to flushing apparatus for water flow control adopted for use in toilets, and more particularly, to the valve means which controls the outflow of the flushing water into the toilet bowl.

It is well known that a great waste of treated water usually occurs when flushing a usual residential type toilet. Most toilet flush tanks have a capacity of approximately six gallons of water, all or substantially all of which is discharged upon each operation of the tank flush valve. In those cases where only a small amount of flushing water is required, for example, to flush liquid waste, the complete discharge of the flush tank contents results in an unnecessary waste of water. It has long been recognized that water can be conserved in the latter case by providing a mechanism that will discharge only that amount of water from the flush tank necessary to the sufficiently flush the liquid wastes. For example, a flush tank discharge of approximately two gallons would normally be sufficient to fully flush liquid waste under usual conditions.

Many prior workers in the art have developed flush mechanisms capable of metering the water utilized in the flush or capable of flushing either the full contents of the tank or one half the contents of the tank upon suitable operation of the handle. U.S. Pat. Nos. 1,960,864, 1,992,381, 2,532,977, 2,636,184, 2,702,908, 2,879,522, 2,963,710, 3,093,833, 3,365,730, 3,546,715, 3,719,957, 3,745,591, and 3,894,299 are exemplary of prior art devices which have been developed in an attempt to solve the problem to which the present application is directed. These devices have all proved to be deficient in one or more important considerations such as complexity of structure, the requirement that substantial portions of the prior mechanism be abandoned, that the devices were not readily compatible with existing equipment, or that installation procedures were so complicated that only skilled workers could be employed to make the installation.

SUMMARY OF THE INVENTION

The present invention relates generally to water saver flush mechanisms suitable for use with tank type toilets in general, and more particularly, is directed to a flush mechanism suitable for use with existing equipment that normally functions in the half flush mode and which can be easily operator controlled to provide full flush operation.

The apparatus of the present invention incorporates a handle operated main shaft to which a support rod and operating finger is connected for flush valve control purposes. The handle and main shaft are normally biased to half flush mode by a plunger type spring. The mechanism fits within existing equipment and includes a minimum number of working parts.

In the half flush mode, the support rod positions an operating finger in the path of pivotal motion of the flush valve to thereby prevent full opening of the flush valve to its usual vertical orientation. With the finger so positioned, the flush valve can open only sufficiently to permit a desired quantity of water, for example, approximately one-half the water contents of the flush tank to flush into the toilet bowl. Lowering of the water within the tank upon flushing will cause the flush valve to automatically reseat and thus prevent escape of the full water contents of the tank.

In the full flush mode of operation, the operating handle is depressed against the bias of the plunger spring in a manner to push the operating finger out of the path of contact with the flush valve. Turning of the operating handle opens the flush valve and causes it to pivot to its usual vertical orientation without interference by the operating finger. With the flush valve fully open and positioned in the normal vertical orientation, full flushing of the tank contents will occur before the flush valve pivots by gravity to again seat on the valve outlet to permit the tank to again fill with water.

The apparatus of the present invention has been illustrated as functioning with a conventional flapper type valve, such as flapper valve No. 3158.078-5-V-7 as manufactured by American Standard Company and suitable for use with the flush valve of a compact Norwall tank. It will be appreciated that the mechanism is adaptable for use with any type of pivoting flapper valve wherein the pivotal motion can be limited by the positioning of the operating finger means in the manner herein illustrated and described.

It is therefore an object of the present invention to provide an improved water saver flush mechanism of the type set forth.

It is another object of the present invention to provide a novel water saver flush mechanism that is entirely compatible for use with existing flush tank equipment to control tank flushing to either approximately one-half tank flush or full tank flush depending upon the desired mode of operation.

It is another object of the present invention to provide a novel water saver flush mechanism that incorporates a spring biased handle which functions a main shaft, a support rod and an attached finger from a normal half flush mode to a full flush mode by pressing the operating handle axially against the bias of the plunger spring.

It is another object of the present invention to provide a novel water saver flush mechanism which can be installed in a conventional toilet flush tank without difficulty by a nonskilled worker, for example, a home owner.

It is another object of the present invention to provide a novel water saver flush mechanism which normally operates in a one-half flush mode and which can be functioned to a full flush mode with ease and efficiency.

It is another object of the present invention to provide a novel water saver flush mechanism that can be easily installed in existing toilet tanks by unskilled workers to minimize the amount of water used in flushing a toilet, thereby effecting a substantial conservation of water.

It is another object of the present invention to provide a novel water saver flush mechanism that includes a spring biased handle, a main shaft attached to the handle and a support rod and operating finger suspended from the main shaft wherein the main shaft has both rotative movement and axial movement under impetus of forces imposed upon the handle.

It is another object of the present invention to provide a water saver flush mechanism in which the operating handle is spring biased to a normal one-half flush mode and which can be readily operated to a full flush mode by depressing the handle against the bias of the operating spring.

It is another object of the present invention to provide a novel water saver flush mechanism which is comprised of relatively few parts which are so contructed and arranged that they will give maximum efficiency and length of service.

It is another object of the present invention to provide a novel water saver flush mechansim which may be incorporated in a conventional toilet tank and which includes means to limit the pivotal motion of the flush valve when in the one-half flush mode to prevent the escape of the full contents of the flush tank upon operation.

It is another object of the present invention to provide a novel water saver flush mechanism that is rugged in construction, simple in operation and trouble free when in use.

Other objects and a fuller understanding of the invention will be had by referring to the following description and claims of a preferred embodiment thereof, taken in conjunction with the accompanying drawings wherein like reference characters refer to similar parts throughout the several view and in which:

BRIEF DESCRIPTION OF THE DRAWING

FIG. 2 is an enlarged, exploded, isometric view of the flush mechanism.

DESCRIPTION OF THE PREFERRED EMBODIMENT OF THE INVENTION

Figure 1:
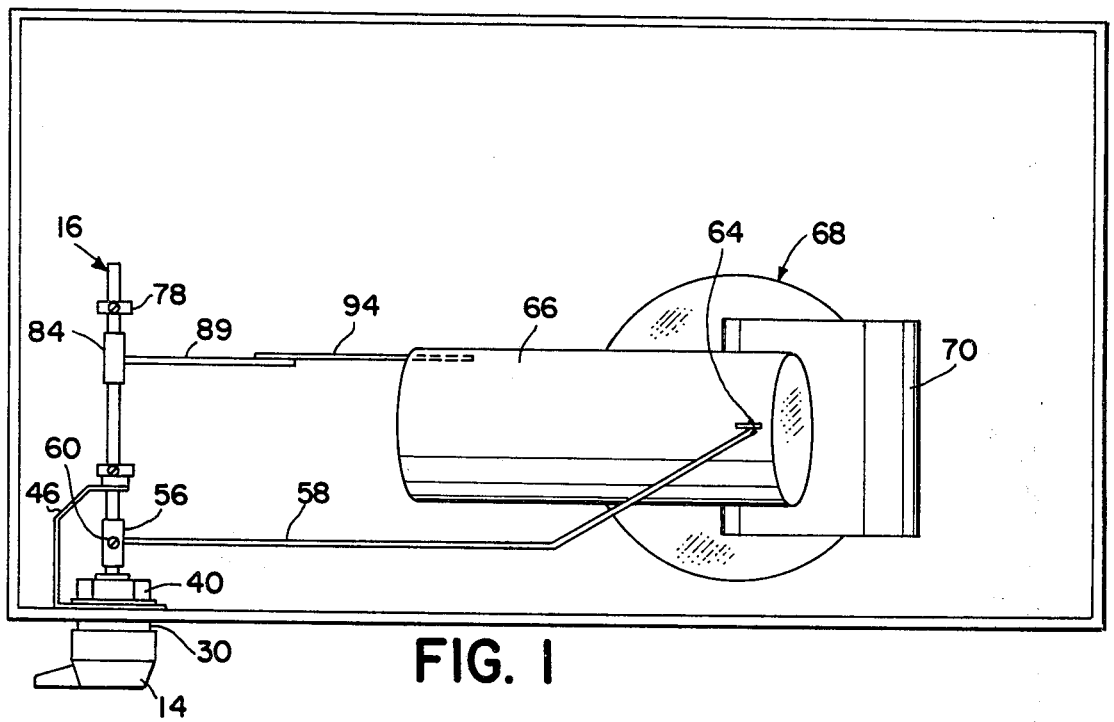
FIG. 1 is a top plan view of the water saver flush mechanism in half flush position.
Figure 1A:
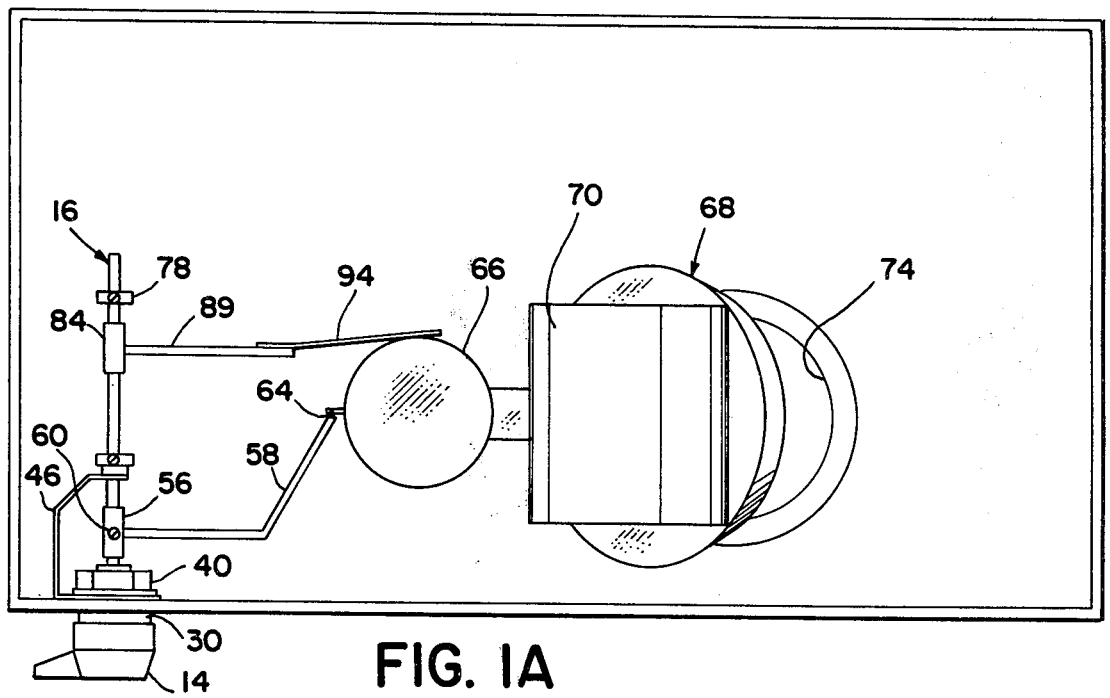
FIG. 1A is a view similar to FIG. 1 showing the mechanism in full flush position.

Although specific terms are used in the following description for the sake of clarity, these terms are intended to refer only to the particular structure of the invention selected for illustration in the drawings and are not intended to define or limit the scope of the invention.

Referring now to the drawings, there is illustrated in FIG. 1 the water saver flush mechanism of the present invention, generally designated 10, applied interiorly of water tank 12 of a conventional toilet. The water saver flush mechanism 10 is normally oriented in the half flush mode as illustrated and may be manually functioned to the full flush mode by simultaneously pressing and turning the handle 14 in the manner hereinafter more fully described.

Figure 4:
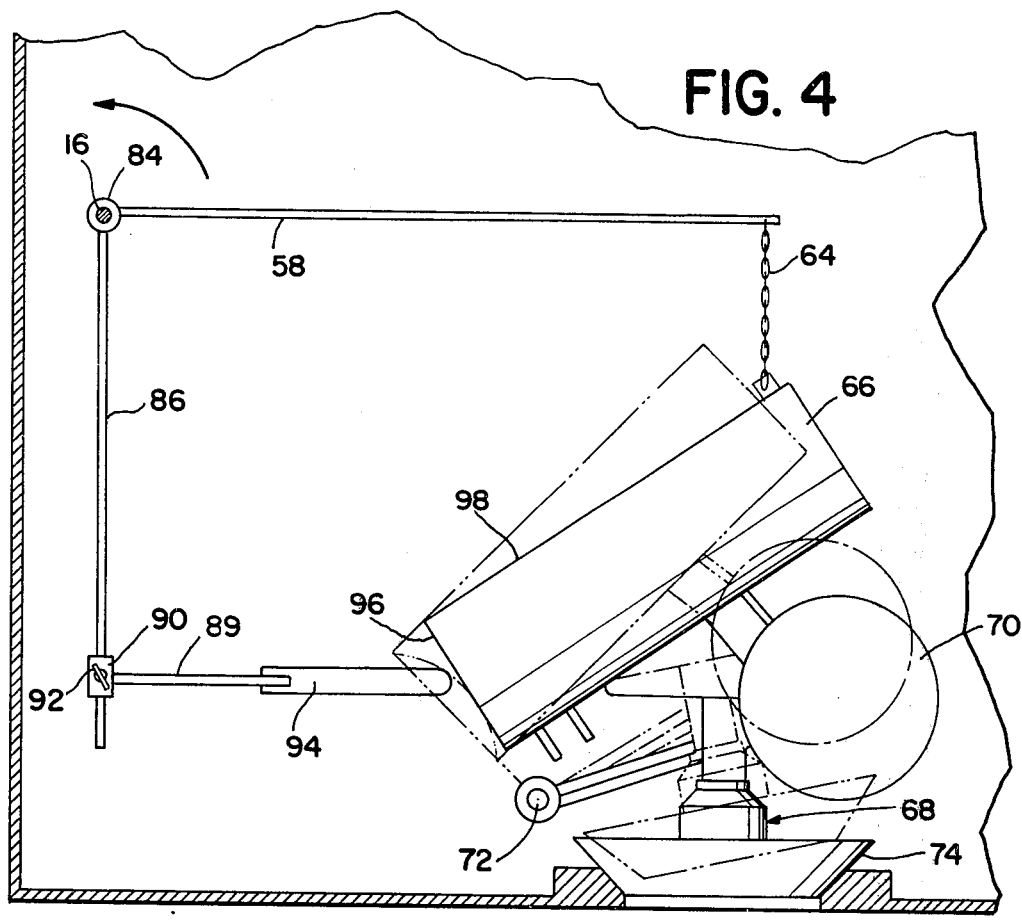
FIG. 4 is a side elevational view of a portion of the flush mechanism associated with a toilet tank flush valve.

As best seen in FIGS. 2 and 4, the flush mechanism 10 comprises generally a main shaft 16 which is horizontaly oriented and which is axially movable from a half flush position as illustrated in full lines in FIG. 4 to a full flush position as shown in dotted lines in FIG. 4 by function of the operating handle 14. one end 18 of the main shaft 16 conventionally extends through the side wall 20 of the toilet tank where it is pinned or otherwise fixed to the handle 14 in well known manner. The end 18 is preferably fluted, ribbed or otherwise treated to enhance the frictional engagement of the end 18 with the handle 14 to assure that the main shaft 16 positively rotates when the handle 14 is rotated by the operator (not shown). The tank sidewall 20 includes a conventional opening 22 within which is positioned a threaded fitting 24 which preferably includes a rectangular body 26. The body 26 extends interiorly of the tank 12 in position to receive the mounting bracket 46 in the manner hereinafter more fully described.

The fitting 24 terminates exteriorly in a head 30 of size larger than the wall opening 22 to thereby define a firm shoulder 42 which bears against the exterior of the tank wall 20 when the parts are assembled. The fitting 24 is provided with an axial bore 28 through which the end 18 of the main shaft 16 extends. The outward extension of the bore 28 is sufficiently large to receive the coil spring 34 which is positioned generally concentrically about the shaft end 18. One end of the spring 34 inwardly stops against the bottom 32 of the bore 28 and continuously biases outwardly toward the handle 14. The handle 14 includes an inwardly facing hollow socket 36 of size to overfit and frictionally engage the end 18 of the main shaft 16 in a tight engagement.

The shaft end 18 may be secured to the handle socket 36 in well known manner, such as by ribs, set screws, threaded connections or otherwise to provide a tight interconnection whereby the shaft 16 will rotate upon the imposition of rotative forces on the handle 14. The hollow socket 36 is sized to fit conveniently within the axial bore 28 without binding or other frictional resistance so that the handle may be urged axially inwardly relatively to the bore 28 by pressing the handle 14 inwardly against the bias of the coil spring 34. It will be appreciated that the main shaft 16 is affixed to the handle and accordingly, when the handle is pushed inwardly against the bias of the spring 34, the main shaft 16 will also move axially inwardly. An axial length of travel of approximately three-eigths of an inch to a half inch has been found sufficient to function the mechanism 10 to permit full flushing of the tank flush valve as hereinafter more fully set forth. It will be noted that the coil spring 34 continuously biases outwardly from the bottom 32 of the axial bore 28 to thereby continuously urge the handle 14 and the handle affixed main shaft 16 outwardly in the direction of the arrow 44 to continuously position the flush mechanism 10 in the half flush mode. See FIG. 3

A generally C-shaped bracket 46 overfits the threaded end 48 of the fitting 24 interiorly of the wall 20 and the leg 51 includes a rectangular opening 50 of size to seat therein the rectangular body 26 of the fitting. The threaded end 48 of the fitting extends through the opening 50 and a conventional nut 40 is employed to threadedly engage the end 48 to secure the bracket 46 and the fitting 24 respectively to the inside and to the outside of the tank wall 20. The inward leg 52 of the C-shaped bracket 46 carries a bearing 54 through which the main shaft 16 axially moves. Thus the shaft 16 is supported within the axial bore 28 of the threaded fitting 24 and the bearing 54 of the mounting bracket 46. The main shaft 16 has both retative movement and axial movement within the bearing 54 and the axial bore 28 in accordance with forces imposed upon the operating handle 14.

A socket 56 is affixed to the shaft 16 and is positioned within the space defined by the outward leg 51 and inward leg 52 of the mounting bracket 46. Socket 56 includes an opening 62 to receive therein one end of the operating rod 58 in a secure manner. After insertion of the end of the operating rod 58, the connection can be secured in conventional manner by tightening the screw 60 sufficiently to bear against the inward end of the operating rod 58. This end may be flattened to receive the set screw 60. The socket 56 is integrally connected with the main shaft 16 in conventional manner such as by soldering and accordingly, the socket 56 will also rotate when the handle 14 and the affixed main shaft 16 is rotated. The outward end of the operating rod 58 connects to a conventional chain which in turn connects to one end of a gravity tube 66 of the flush valve 68. Thus upon rotation of the handle 14 in the usual manner the main shaft 16 will rotate to elevate the operating rod 58. Rotation of the operating rod 58 in a counterclockwise direction as viewed in FIG. 4 will cause the chain 64 to pull the gravity tube 66 upwardly and cause the flush valve 68 to rotate in a counterclockwise direction about its pivot 72.

In a conventional arrangement, this operation or rotative movement of the operating rod 58 would normally cause the flush valve 68 to rotate fully about its pivot 72 until the gravity tube 66 reached a substantially vertical position. In such an orientation (not illustrated), the valve closure 74 would be elevated off of the tank outlet seat to fully flush the water contents of the tank 12. The flush valve float 70 and gravity tube 66 would then function in conventional manner as the elevation of the water descended to close the valve closure 74 against the tank outlet seat after the water contents had been fully flushed.

The present flush valve mechanism 10 functions in the full flush mode to permit normal operation of the flush valve 68 in the manner above described without alteration to the flush mechanism by pressing the handle, the affixed main shaft and the operating rod inwardly. It will be noted that the small length of inward travel of the operating rod will not interfer with normal flushing inasmuch as the chain 64 will compensate for this movement. In the half flush mode, as hereinafter more fully set forth, the flush mechanism 10 restricts rotative movement of the flush valve 68 about its pivot 72 to thereby control the amount of water that will be flushed upon rotative movement of the operating handle 14.

Figure 3:
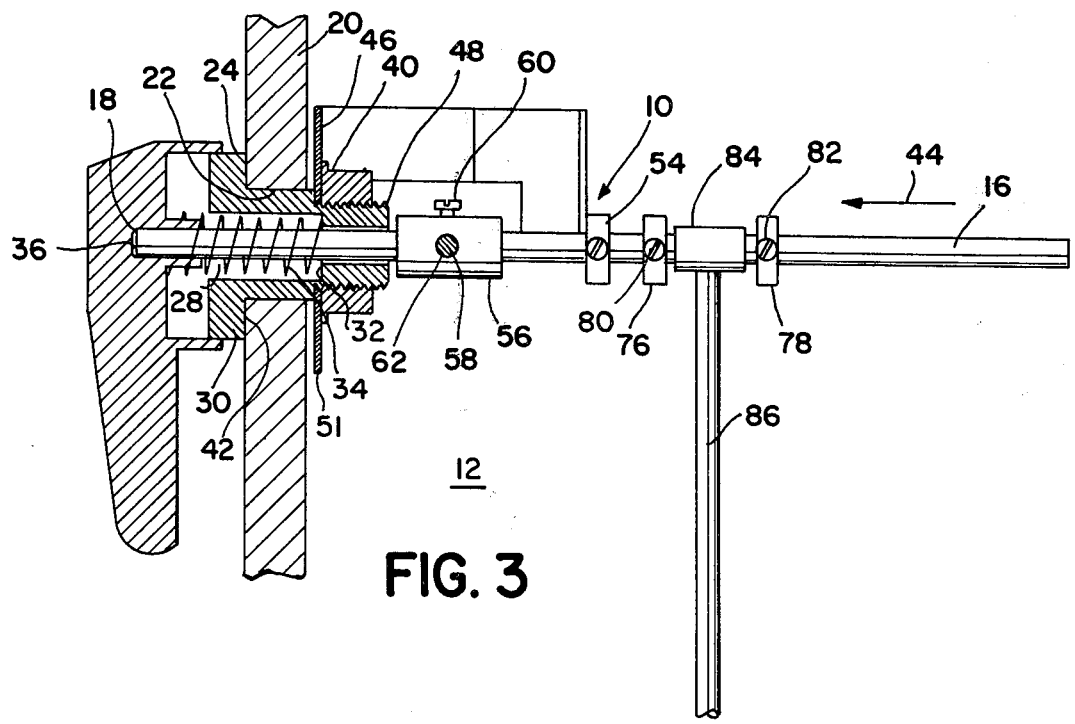
FIG. 3 is an enlarged, elevational view of the flush mechanism in half flush position, partially in section to disclose interior construction details.

As illustrated in FIGS. 2 and 3, a hollow socket 84 overfits the main shaft 16 inwardly from the bearing 54 and is a sliding, rotative fit thereon. A pair of inward and outward stops 76, 78 are slidable along the main shaft 16 on either side of the hollow socket 84 and may be fixed in any longitudinal position by the respective set screws 80, 82. By adjusting the position of the hollow socket 84 along the length of the main shaft 16, the device can be relatively universally adaptable for use with existing flush valves without special parts and without disturbing existing conditions. The fit between the hollow socket 84 and the main shaft 16 should be sufficiently loose to permit relatively free rotative action of the shaft 16 without rotating the socket 84. A vertical support rod 86 fixedly connects to the hollow socket 84 and depends therefrom. The weight of the support rod 86 and the affixed operating finger 89 will be sufficient to overcome any frictional engagement between hollow socket 84 and the main shaft 16 so that there is no tendency of the socket 84 or the depending support rod 86 to rotate when the handle 14 is rotated.

A socket 90 is slidable along the support rod 86 and may be secured in any desired vertically adjustable position in conventional manner by employing a set screw 92. The operating finger 89 extends from the socket 90 in a fixed manner and preferably extends at substantially right angles to the orientation of the support rod 86. The operating finger 89 terminates outwardly in a spring extension 94 which contacts the flush valve 68 in the manner hereinafter more fully described. It will be noted that the horizontal adjustment of the hollow socket 84 along the main shaft 16 and the vertical adjustment of the operating finger 89 along the support rod 86 function to facilitate easy adjustment of the spring extension 94 relative to the flush valve 68. Additionally, the socket 90 has full rotative movement relative to the support rod 86 to further facilitate adjustment of the position of the spring extension 94.

As best seen in FIGS. 1 and 4, in the half flush mode of operation, the spring extension 94 of the operating finger 89 is positioned within the path of pivotal travel of the gravity tube 66 about the flush valve pivot 72 to thereby normally prevent rotation of the gravity tube 66 about the pivot 72 to a full vertical position, which position would normally be reached when the flush valve 68 is employed to fully flush the water contents of the toilet tank 12. By preventing full vertical orientation of the gravity tube 66, the operating finger 89 causes the flush valve 68 to close so that the closure 74 seats upon the valve outlet seat before the entire water contents of the tank 12 are emptied. As above set forth, the spring 34 normally biases the handle 14 and the fixed main shaft 16 to the outermost position. When adjusting the parts, with the main shaft 16 in the said outermost position, the stops 76, 78 are fixed to the main shaft 16 and the socket 90 is affixed to the support rod 86 in position to orient the spring extension 94 in a position to be contacted by the bottom of the gravity tube 66 to thereby prevent full pivotal movement to the normal vertical position.

By pushing the operating handle 14 inwardly to thereby also force the main shaft 16 inwardly, the stops 76, 78 act to also cause the support rod 86 to move correspondingly inwardly. In the full flush mode of operation, this inward travel of the support rod 86 and the affixed operating finger 89 will be sufficient to cause the bottom of the gravity tube 66 to swing or pivot about the pivot point 72 clear of the spring extension 94 to thereby assume the full vertical position. In the full vertical position (not illustrated), the flush valve 68 will operate in the conventional manner and will cause the entire contents of the tank 12 to exit through the outlet valve. It will be appreciated that once the bottom 96 of the gravity tube 66 is pivoted past the operating finger 88, the spring extension 94 will be automatically returned to the half flush mode by action of the spring 34 and will then contact the side 98 of the gravity tube 66. The spring extension 94 is fabricated of the leaf spring type of design to bend about the outer periphery of the gravity tube 66 without building sufficient frictional forces to prevent normal rotative movement of the flush valve 68 about its pivot 72 as the water exists from the tank 12. When the flush valve 68 pivots to the fully closed position as illustrated in FIG. 4, the natural bias of the spring extension 94 will again position the spring extension in a position to engage the bottom 96 of the gravity tube 66 upon the next flushing operation.

By adjusting the height of the socket 90 along the support rod 86, the position where the bottom 96 of the gravity tube 66 contacts the spring extension 94 can be easily adjusted to thereby allow more or less water to exit from the tank 12 when flushing in the half flush mode. Thus a device has been provided which is readily compatible with existing toilet flush mechanisms and further which can be readily adjustable within the toilet tank to permit any desired amount of water to exit from the tank 12 upon flushing from either full flush of the tank contents or to some partial flush of the tank contents.

Although the present invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. In a water saver flush valve mechanism for use within toilet tanks of the type including a flush valve which is movable about a pivot upon function of an operating handle, the improvement which comprises
   A. main shaft means connected to the operating handle and being axially movable by the handle from a first mode of operation position to a second mode of operation position;
   B. support rod means carried by the main shaft means, said support rod means being moved from a first position to a second position upon function of the main shaft means to the said second mode of operation position; and
   C. operating finger means carried by the support rod means and being movable from a first position to a second position when the main shaft means is moved from its first mode of operation position to its second mode of operation position;
      1. said operating finger means contacting a portion of the flush valve when in the said first position and not contacting the portion of the flush valve when in the second position.

2. The water saver flush valve mechanism of claim 1 and spring means interposed between the main shaft means and the operating handle means, said spring means normally biasing the main shaft means to the said first mode of operation position.

3. The water saver flush valve mechanism according to claim 1 wherein the main shaft means is rotatably movable by the operating handle.

4. The water saver flush valve mechanism according to claim 3 wherein the support rod means is not rotatably movable by the operating handle.

5. The water saver flush valve according to claim 1 and means to axially adjust the position of the support rod means on the main shaft means.

6. The water saver flush valve according to claim 5 and means to axially adjust the position of the operating finger means on the support rod means.

7. The water saver flush valve according to claim 6 wherein the support rod means is vertically positioned and wherein the axial adjustment of the operating finger means changes the vertical position of the operating finger means relative to the operating handle.

8. The water saver flush valve according to claim 1 wherein the main shaft means is generally horizontally oriented in the position of both the first and second modes of operation.

9. The water saver flush value according to claim 8 wherein the support rod means is generally vertically positioned in both its said first position and in the second position.

10. The water saver flush valve mechanism according to claim 1 and means to connect the support rod means to the main shaft means to permit rotation of the main shaft means relative to the support rod means.

* * * * *